United States Patent [19]
Nebgen

[11] 3,727,587
[45] Apr. 17, 1973

[54] SYSTEM FOR RECOVERING WASTE HEAT FROM COPPER CONVERTERS

[75] Inventor: William Nebgen, Woodside, N.Y.

[73] Assignee: Treadwell Corporation, New York, N.Y.

[22] Filed: Nov. 17, 1971

[21] Appl. No.: 199,738

Related U.S. Application Data

[63] Continuation-in-part of Ser. No. 44,673, June 9, 1970, abandoned.

[52] U.S. Cl. ................................................. 122/7 A
[51] Int. Cl. ................................................. F22b 1/18
[58] Field of Search .................... 122/7 R, 7 A; 75/72

[56] References Cited

UNITED STATES PATENTS

| | | | |
|---|---|---|---|
| 3,224,841 | 12/1965 | Kemmetmuller | 23/262 |
| 3,320,931 | 5/1967 | Durham | 122/7 |
| 3,655,361 | 4/1972 | Brown et al. | 122/7 |

*Primary Examiner*—Kenneth W. Sprague
*Attorney*—Robert Ames Norton

[57] ABSTRACT

A copper converter in which copper sulfide is burned to sulfur dioxide is operated with a tight air hood. The gaseous products from the converter contain dust, which melts or is sticky at the temperature at which the gases leave the converter. The gaseous products are mixed with a large amount of cool gases of substantially the same sulfur dioxide content to a temperature at which the dust is no longer sticky, and, if desired, a major portion of the dry dust is removed. The mixed gases are passed through a waste heat boiler which cools them down further. A major portion of the cooled mixed gases is used for the recycling with the hot gases from the converter and a small amount corresponding to the air used in the converter is vented to a plant, such as an acid plant, in which the sulfur dioxide is utilized.

6 Claims, 1 Drawing Figure

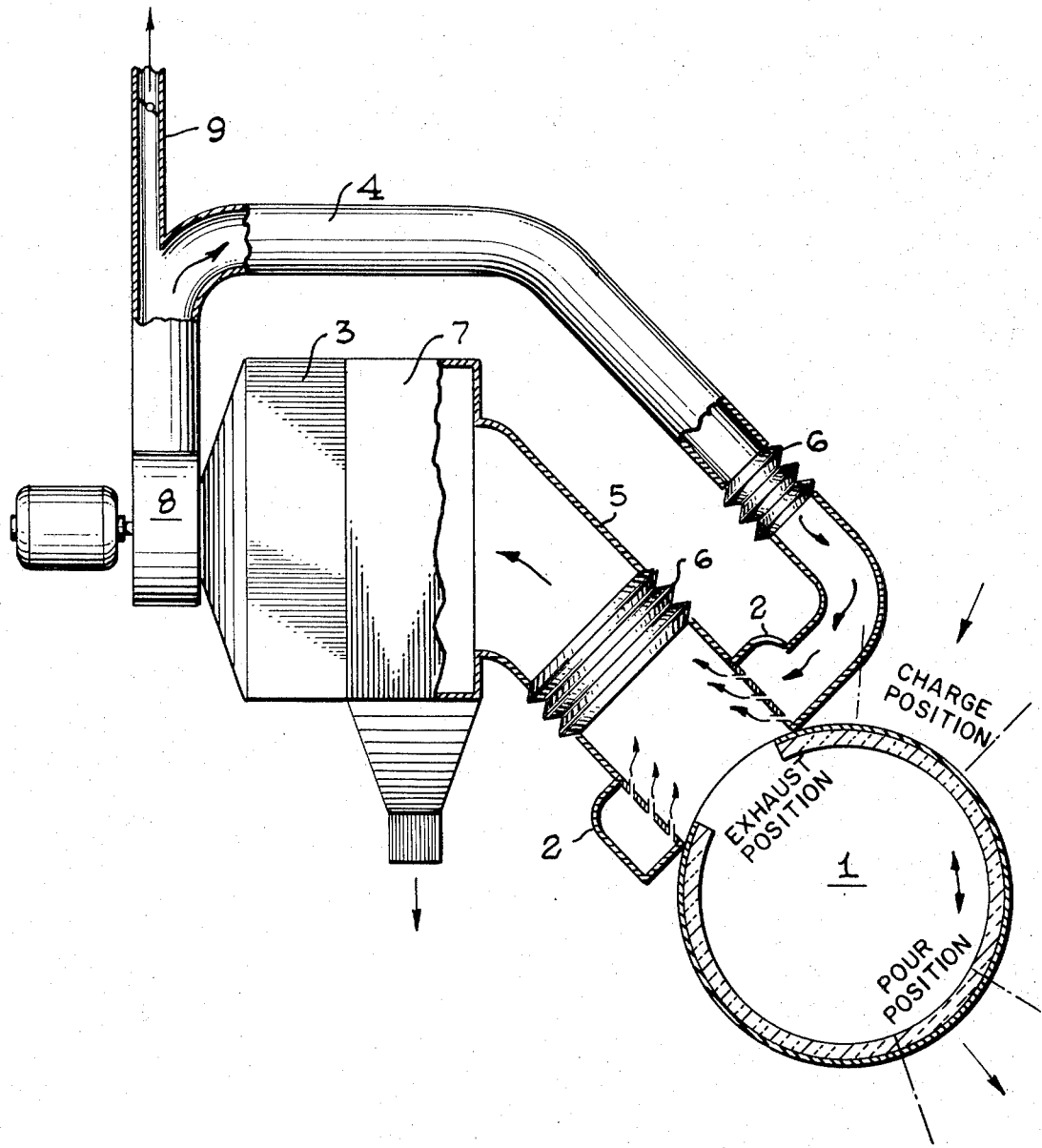

SYSTEM FOR RECOVERING WASTE HEAT FROM COPPER CONVERTERS

RELATED APPLICATION

This application is a continuation-in-part of my co-pending application Ser. No. 44,673, filed June 9, 1970 now abandoned.

BACKGROUND OF THE INVENTION

Copper converters, which are rotatable vessels, are turned to a charge position, charged with copper matte, and turned to a blow or exhaust position in which air is blown through, burning the sulfur in the sulfide of the matte to sulfur dioxide. The converter is then turned to a pour position, in which the converted molten charge is poured out. The converter is returned to the charge position, charged with a fresh charge of matte, and the cycle is repeated. The combustion gases, which contain sulfur dioxide and nitrogen (from the blow air), are then cooled in a waste heat boiler to recover the waste heat. The gases from the converter cannot be used directly in a waste heat boiler because they contain dust which is molten at the temperature at which the gases leave the converter. The dust would deposit and solidify on the waste heat boiler surfaces, and the installation would plug up and become no longer operative.

The gases, therefore, have to be cooled or quenched to a temperature at which the dust is no longer sticky before encountering the waste heat boiler, preferably after collecting the dust. In the past this cooling or quenching has been effected either by steam or water or by introducing cold air. These methods permit the converter to operate without plugging the waste heat boiler, but they introduce substantial thermal losses because the greater part of the quench heat is completely lost. When cold air is introduced in a quantity sufficient to bring the temperature down to a point at which the dust is no longer sticky, the extra oxygen in the quenching air tends to form some $SO_3$, which is corrosive, and in addition the $SO_2$ is so greatly diluted that it cannot be used for many purposes, such as a contact sulfuric acid plant, which for practical operating conditions requires a certain minimum $SO_2$ concentration. Nevertheless, air quenching is at present most commonly used and the economic losses tolerated as the price for permitting the converter to operate at all. Usually the air is introduced through a loose hood or seal when the converter is blown, the additional air entering and mixing with the gases. This requires that an induced draft fan be provided to maintain sufficient negative pressure so that $SO_2$ is not blown out into the atmosphere instead of quenching air taken in.

SUMMARY OF THE INVENTION

In the present invention instead of quenching the gases from a copper converter with steam, water or air, with the drawbacks referred to above, a large portion of cooled gases from the converter blow which have passed through a waste heat boiler are recycled and mixed with the gases from the converter. A large circulating load of these cooled gases is involved, but the heat is not lost because the waste heat boiler removes just as much heat from a large volume of less hot gases as from a small volume of much hotter gases, which is impractical because of the low melting dust in the gases. The amount of gases recycled for quenching is sufficient so that after mixing the temperature is below the point at which the dust is sticky.

Without additional steps or equipment, the sulfur dioxide-containing gases leaving the waste heat boiler, or rather the smaller portion which is not recycled, are not only cooled in a manner permitting recovery of all the waste heat, but there is no reduction in the concentration of sulfur dioxide and it can, therefore, be effectively utilized without requiring further concentration.

The present invention is not directed to the broad concept of quenching by mixing cooled spent gases. This is described in conjunction with a closed cycle Brayton engine using helium as a working fluid in the La Fleur U.S. Pat. No. 3,258,508, June 23, 1966. In that patent the sole function of the mixing is to prevent a temperature too high for the heating surfaces of the helium heat exchanger. In the present invention, which is limited to copper converters, the mixing performs two functions at the same time and without additional equipment, namely moderation and recovery of heat and maintenance of sulfur dioxide in an undiluted concentration. Two important functions are performed by the same pieces of equipment or steps. In addition, the removal of particulates from the gases is a third, preferred function which can be performed where desired. In the case of the La Fleur equipment this function is not performed as there are no low melting particulates, fuel and air being substantially clean. Thus the present invention permits performing two functions always and in a preferred form three functions, whereas the La Fleur system performs only one with the same number of elements.

In copper converters there is normally a hood over the converter mouth when it is turned to the exhaust or blow position, and this hood fits loosely. In the present invention the hood is needed but it fits tightly because no in-leakage of air is either needed or desired. The hood, of course, has to be moved to permit the turning of the converter to its different positions, but this is accomplished by using flexible couplings, which are simple mechanical structures and add negligibly to the cost of the whole plant.

Since the converter proper is not changed by the present invention, in the specific description which will follow and in connection with the drawings it is shown purely diagrammatically.

BRIEF DESCRIPTION OF THE DRAWING

The drawing is an elevation, partly broken away and partly in section, of a converter in the blow or exhaust position.

DESCRIPTION OF THE PREFERRED EMBODIMENTS

A copper converter 1, which is a rotatable horizontal cylindrical vessel lined with refractory material, has an opening through which the exhaust gases pass. When the converter charge is being blown with air, a hood 2 connects the exhaust opening with a waste heat boiler 3. During the charge and pour parts of the cycle, the air blow is discontinued, the exhaust opening is turned away from the hood, and charge is added or product is discharged through the opening.

The converter is of standard design, being capable of rotation to charging and pouring positions, as is normal. It receives combustion air from the customary source, (not shown). The drawing shows the converter in the exhaust position, and the retractable hood 2 is shown as forming a tight seal in this position. With this tight seal the hood has to be retracted when the converter is rotated for charging and pouring. The hot exhaust gases are far too hot to be used directly in a waste heat boiler because they contain a large amount of dust, which is sticky at these higher temperatures. The hot exchaust gases therefore are mixed with a large stream of cooled gases through the pipe 4. From the hood 2 a conduit 5 leads to a dust collector 7. The conduit and also the recycling conduit 4 are provided with flexible portions 6 which permit retracting the exhaust hood when the converter is charged and/or poured.

The large volume of gases then passes from the conduit 5 through dust collector 7 and then through the waste heat boiler 3, where steam is generated. The design of the waste heat boiler is conventional, and therefore no details are shown. Before passing through the waste heat boiler, the dust is collected in a dust collector 7, it being noted that the temperature of the gases entering the boiler 3 is below that at which the dust is sticky and so there is no buildup or slagging on the heating surfaces of the waste heat boiler. From the dust collector, a blower 8 blows a stream the major portion of which is recirculated through the pipe 4, as has been described; a minor portion passes out through the pipe 9, where its heat may be recovered, for example by heating feedwater for the boiler 3.

It will be noted that there is a relatively tight seal of the retractable hood 2. In other words, no significant inflow of air occurs; whereas in copper converters used in the past the hood had a deliberately loose seal and a large amount of ambient air or other cooling material was introduced to bring the temperature down to the point where the dust would no longer be sticky and tend to form deposits on the heating surfaces of the boiler 3. When air is used for quenching, as was done in the past and as has been mentioned above, the heat required to heat up the air from ambient temperature to the temperature at which the gases can safely enter the boiler 3 is entirely lost, and in addition, the increased amount of oxygen results in a greater formation of sulfur trioxide which may be very corrosive to the boiler.

An important advantage is that the sulfur dioxide content of the gases leaving the converter is not significantly diluted and remains at a point sufficiently high for effective utilization of the $SO_2$, either in a sulfuric acid plant or even by producing elementary sulfur therefrom. This was not practicable with the dilute $SO_2$ produced when the quenching was effected with air or other gases. The present invention therefore performs at the same time two valuable functions: it does not dilute the sulfur dioxide and there is no substantial loss in quenching heat as practically all of this is carried through the boiler 3 as sensible heat in the quenched gases passing through the conduit 5. The relatively large amount of cooled gases which pass through the pipe 4 constitutes a circulating load and does not result in any significant loss.

When the converter effluent gases are quenched with ambient air in the prior art, the concentration of $SO_2$, initially about 12 percent when the gases leave the converter, falls to about 3.66 percent, and the concentration of $O_2$, initially almost zero, increases to about 13.9 percent. This concentration of $SO_2$ is too low for a sulfuric acid plant, and expensive methods must be used in order to raise it to an acceptable 8 percent. Furthermore, the oxygen which is introduced as part of the quenching air provides excess oxygen, that tends to promote the formation of $SO_3$, which when combined with water is very corrosive to the boiler materials.

In the present invention the converter hood is kept as tight as possible so as to minimize the infiltration of room air. The $SO_2$ concentration remains at about 12 percent; less $SO_3$ is formed; less corrosion is experienced; and the effluent gases readily can be used to make sulfuric acid, or the $SO_2$ can even be reduced to elemental sulfur. It is completely impractical to attempt to produce elemental sulfur from a prior art gas which contains 3.66 percent $SO_2$ and 13.9 percent $O_2$, because this gas requires about 4.8 times the amount of reducing agent that would be required to reduce the $SO_2$ alone.

In the prior art, if the converter hood is kept tight so as to minimize air in leakage and thus maximize $SO_2$ concentration, the hood must be of very complicated construction, even water cooled, since it "sees" 2,400°F. gases which are contaminated with sticky dust. This high temperature also makes it very difficult to make a tight hood. Furthermore, quenching subsequently with water or steam greatly increases the dewpoint of the quenched gases and significantly increases their corrosiveness.

By contrast, in the present invention the tight hood is of very simple construction, since it "sees" only 800°F. gases which contain dust which is no longer sticky, and it is quite easy to make the hood tight at 800°F.

I claim:

1. A process of operating a copper converter which comprises cooling the converter gases in a waste heat boiler and quenching the gases before they reach the boiler by recycling cool gases after passing through the waste heat boiler, the volume of recycled cool gases being sufficient to cool the mixed gases to a temperature below that at which dust from the copper converter is sticky, whereby the portion of the cooled gases from the waste heat boiler which are not recycled have an undiluted concentration of $SO_2$.

2. A process according to claim 1 in which the volume of recycled cool gases is sufficient to bring the temperature of the mixed gases down to approximately 800°F.

3. A process according to claim 2 in which dust is removed from the mixed gases before passing through the waste heat boiler.

4. A process according to claim 1 in which dust is removed from the mixed gases before passing through the waste heat boiler.

5. An apparatus for recovering the waste heat from a copper converter comprising, in combination, a converter capable of being turned to charge position, exhaust position and pour position, a waste heat boiler, a retractable hood capable of forming a tight seal to the converter in the exhaust position, an extendable conduit from the hood to the waste heat boiler and means for recycling a major portion of gases leaving the waste heat boiler to mix with the gases from the converter in the hood.

6. An apparatus according to claim 5 in which a dust collector is between the conduit and the waste heat boiler.

* * * * *